United States Patent [19]

Vasan

[11] 4,140,751

[45] Feb. 20, 1979

[54] PROCESS FOR PRESSURE STRIPPING OF SULFUR DIOXIDE FROM BUFFERED SOLUTIONS

[75] Inventor: Srini Vasan, New Canaan, Conn.

[73] Assignee: Peabody Process Systems, Inc., Stamford, Conn.

[21] Appl. No.: 774,474

[22] Filed: Mar. 4, 1977

[51] Int. Cl.$^2$ .................. C01B 17/00; C01B 17/48
[52] U.S. Cl. .................................. 423/243; 423/539; 423/242
[58] Field of Search .............................. 423/242–244, 423/539, 575; 55/73

[56] References Cited

U.S. PATENT DOCUMENTS

| 1,589,133 | 6/1926 | Eustis | 423/539 |
| 3,687,623 | 8/1972 | Terrana et al. | 423/539 X |
| 3,767,777 | 10/1973 | Frye et al. | 423/539 |

OTHER PUBLICATIONS

The CITREX Process for SOx Removal, S. Vasan, Chemical Engineering Progress, (vol. 71, No. 5), May 1975, pp. 61–65.

*Primary Examiner*—G. O. Peters
*Assistant Examiner*—Gregory A. Heller
*Attorney, Agent, or Firm*—St. Onge, Steward, Johnston, Reens & Noe

[57] ABSTRACT

A process for steam stripping sulfur dioxide from a buffered aqueous solution in which it is absorbed in a flue gas desulfurization process is carried out at pressure greater than atmospheric. The process of pressure stripping of sulfur dioxide surprisingly results in increased steam economy as compared to stripping at atmospheric pressure and yields sulfur dioxide vapor which can be directly condensed to a liquid product with ordinary cooling water, eliminating the need for drying, refrigeration or compression operations. The high temperatures corresponding to high steam pressures enable economical use of stripping vessel overheads for preheating operations also. Stripping at pressures of 50 to 65 psig results in steam requirements which are only one-third to one-half of that at atmospheric pressure stripping. At the high pressures lower gas flow rates permit the use of more compact stripping equipment.

13 Claims, 1 Drawing Figure

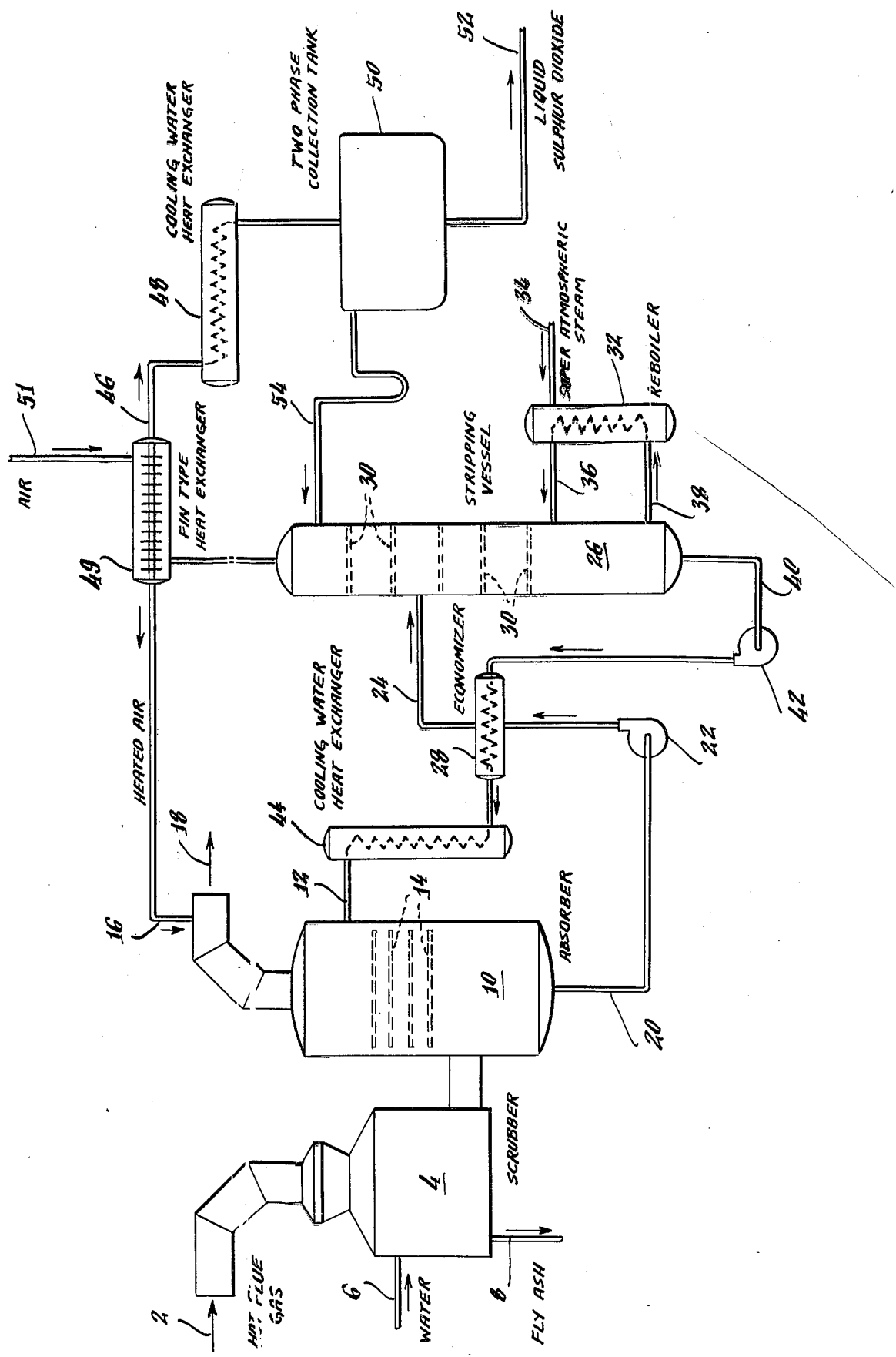

PROCESS FOR PRESSURE STRIPPING OF SULFUR DIOXIDE FROM BUFFERED SOLUTIONS

BACKGROUND OF THE INVENTION

This invention relates to flue gas desulfurization processes and more particularly to a process of regenerating sulfur dioxide absorbed in buffered solutions used to scrub sulfur dioxide from gases such as flue gas.

Presently available flue gas desulfurization processes include so-called throw-away systems, utilizing limestone or lime scrubbing, as well as regenerative processes, utilizing buffered aqueous solutions for sulfur dioxide absorption, that yield sulfur as a byproduct. One such regenerative process, using a buffered citrate solution to scrub sulfur dioxide from a gas in a countercurrent absorber and reacting the sulfur dioxide-laden liquor from the absorber with hydrogen sulfide to recover sulfur, is known by the name, CITREX, a trade name of Peabody Engineered Systems, Stamford, Connecticut. A description of the CITREX process and a discussion of its advantages over throw-away methods such as limestone scrubbing appears in "The CITREX Process for $SO_2$ Removal", *Chemical Engineering Progress*, Vol. 71, No. 5, May 1975.

A limestone process of flue gas desulfurization has the drawbacks of sludge disposal and high raw material cost of lime or limestone. By contrast, the citrate process, especially as modified in the CITREX process, provides advantages such as sulfur recovery as a byproduct as well as lower initial and operating costs. Nevertheless, the use of hydrogen sulfide to convert the sulfur dioxide absorbed in the citrate solution to yield sulfur and water may not be commercially attractive in all situations. Thus, where it is necessary to synthesize hydrogen sulfide at a plant site from hydrogen produced from natural gas, the increasing unavailability of natural gas or similar raw material for the production of hydrogen makes such a process less desirable.

In U.S. Pat. No. 1,589,133 to Eustis there is disclosed a method of recovering sulfur dioxide from smaller smoke or other gases by absorbing the sulfur dioxide in a solution of a metallic salt, such as aluminum sulfite, which will form a relatively unstable sulfite or bisulfite with the sulfur dioxide and which will readily liberate the sulfur dioxide gas at moderate temperatures. The sulfur dioxide gas is extracted from the solution by diluting the atmosphere in contact with the solution and consequently reducing the partial pressure of the sulfur dioxide in the gases or atmosphere contacting with the solution. The patentee states that this is done in an extractor into the bottom of which is directly fed live steam and into the top of which is fed the sulfur dioxide containing solution. By making the extractor very large and prolonging solution dwell time a large percentage of the total sulfur dioxide is said to be extracted at each cycle. The extraction may be carried out under pressures below atmospheric, using a vacuum pump, although a vacuum is not necessary as dilution of the atmosphere resulting in reduction of the partial pressure of the sulfur dioxide is said to work satisfactorily when the extraction is carried on at, or even above, atmospheric pressure.

The use of live steam, as in Eustis, is attendant with several disadvantages. The steam used must be produced from water which has been treated to avoid contaminating the stripping system or the constituents therein, resulting in added expense. Also, the live steam condenses in the system and dilutes the solution absorbing the sulfur dioxide so that either further separation or waste discharge is required. The former is uneconomical while the latter is impractical under current environmental procedures as well as a costly use of raw material.

SUMMARY OF THE INVENTION

I have found that the advantages of sulfur dioxide absorption by the citrate and similar buffered aqueous solution processes can be recognized without the need for reaction with a reducing gas, such as hydrogen sulfide, for regenerative reaction. This is achieved, according to this invention, through the provision of a process in which sulfur dioxide is regenerated from the sulfur dioxide-laden absorber liquor by steam stripping under pressure.

It was unexpectedly discovered, according to this invention, that steam stripping at super atmospheric pressure, for example, in the advantageous range of 5 to 65 psig, results in a lowered steam requirement per pound of sulfur dioxide stripped as compared to atmospheric or slightly above atmospheric pressure operation. Thus, it has been surprisingly discovered that apparently the decomposition of a sulfur dioxide citrate complex to yield sulfur dioxide proceeds faster and more efficiently at high temperatures corresponding to high pressures than does the contervailing effect of the high pressure on the solubility of sulfur dioxide in the citrate buffered solution. Moreover, the pressure stripping process of this invention yields stripped sulfur dioxide which can be directly condensed with ordinary cooling water to produce liquid sulfur dioxide as a product without the need for drying, refrigeration or compression systems. The overhead stream from the stripping process is at a sufficiently high temperature to preheat air that can be subsequently used for direct mixing and reheating of the cold treated flue gas stream from the absorber, resulting in greater overall process economies. Also, the pressure stripping process results in actual gas flow volumes which are several times less than those present in low pressure stripping so that the stripping column may be a more compact unit and initial equipment costs can be reduced.

Accordingly, a feature of this invention is the provision of a process for the stripping of sulfur dioxide from buffered solutions in which it is absorbed by stripping under pressure.

Advantageous pressures for the steam stripping of sulfur dioxide from citrate liquor loaded with sulfur dioxide is in the range of 5–65 psig and preferably 15–65 psig. At pressures of 15–65 psig, the high temperature of the steam, in the range 250°–310° F., accelerates the rate of sulfur dioxide release and more than balances any tendency of sulfur dioxide to go into solution at the high pressure involved. This higher sulfur dioxide release results in steam requirements in the range of 5 to 8 pounds steam per pound of sulfur dioxide stripped in contrast to steam requirements which are several fold higher at low pressure operation, such as at atmospheric or slightly above. At atmospheric pressure or slightly above, the overhead sulfur dioxide gas stream requires a dryer and refrigeration system or compression system for recovery of stripped sulfur dioxide as a product liquid.

In the pressure stripping process according to this invention, the sulfur dioxide stripped off at 15–65 psig can be directly condensed with ordinary cooling water having a temperature in the range of 50° to 90° F. to produce liquid sulfur dioxide and thus avoiding prohibitive dryer and refrigeration or compression power consumption requirements. The overhead stream leaving the rectification section of the stripping vessel is at a temperature of about 240° to 290° F. and can be used to preheat air which in turn can be used for direct mixing with and reheating of the cold treated flue gas stream from the top of the absorber to heat it from about 120° to 140° F.

While the pressure range of 5-65 psig is advantageous and 15-65 psig is preferred, it will be understood that the advantages of the invention are recognized at pressures above atmospheric generally. The limiting facts are the decomposition of the buffered solution which can occur, for example at 310° F., which corresponds to about 65 psig, and the availability of low temperature cooling water to condense the sulfur dioxide vapors. For example, 60° F. water would permit operation at 25-30 psig.

The steam economy in the pressure stripping process of this invention is such that the process requires only about one-third to one-half the fuel needs of comparable currently available fuel desulfurization processes. The use of the sulfur dioxide pressure stripping process according to this invention allows the flue gas desulfurization system to be compact, since regenerative equipment is reduced, and, since this is an all liquid system with no solids or sulfur to plug or cake equipment, it is a clean and simple system to operate. Thus, the process can be operated for extended periods with reduced operational and maintenance labor. Hence, economies result from this invention in several areas. Initial equipment costs are lower because of the compact regenerative system, the high operating availability reduces costly down-time and the ability to be operated by one operator results in lower labor costs, all of which are in addition to the fuel economy described above.

Thus, a further feature of this invention is the provision of a process for steam stripping sulfur dioxide from a solution resulting from a fuel gas desulfurization process which results in increased reliability and reduced cost.

The foregoing and additional features, objects and advantages of this invention will be further apparent from the following detailed description of a preferred embodiment thereof taken in conjunction with the accompanying drawing.

BRIEF DESCRIPTION OF THE DRAWING

The FIGURE is a schematic diagram illustrating the process scheme for high pressure steam stripping of sulfur dioxide absorbed in a buffered solution in a flue gas desulfurization process, according to an embodiment of this invention.

DESCRIPTION OF THE PREFERRED EMBODIMENT

Referring to the FIGURE, there is shown hot flue gas represented at 2 entering a scrubbing system 4 in which the gas is cleaned and cooled. The scrubbing system 4 may advantageously be of the venturi type which is commercially available and a further description of which is unnecessary to the present invention except to point out that the flue gas is cleaned of particulates and cooled by water entering the system 4 at 6 and particulate material such as fly ash is removed as illustrated at 8.

Gas leaving the scrubber system 4 is passed upward through the absorber 10 countercurrent to a down-flowing buffered citrate solution introduced into the absorber 10 at 12 and distributed in a tray-type or packed-bed column absorber schematically shown. The absorber 10 may advantageously be a Peadboy Tray Absorber having trays 14 which provide high efficiencies of sulfur dioxide removal and low L/G ratios. The clean waste gas is tangentially mixed with heated air, shown at 16, and exits the absorber at 18 while the sulfur dioxide-laden absorber liquor exits the absorber bottom at 20.

After leaving the absorber the sulfur dioxide-laden citrate liquor is pumped, such as by the pump 22 to enter the top, at 24, of the pressure stripping vessel 26, after passing through the economizer 28 where it is heated by the hot bottoms from the stripping vessel. Alternately, the absorber liquor may partially bypass the economizer 28 and be fed to the top of the stripping vessel 26, in the rectification section. Within the stripping vessel 26 the absorber liquor flows downward over either a packed bed, or advantageously, over trays schematically represented at 30. Vapor flows upward through openings in the trays as a result of heating of the solution. Heating takes place in the stripping vessel bottom by means of circulation through the reboiler 32. The reboiler 32 is heated by steam under pressure entering at 34 for indirect heating of the sulfur dioxide laden liquor circulating through the lines 36 and 38.

The buffered citrate solution from which the sulfur dioxide has been stripped exits the stripping vessel 26 at 40 and is pumped, as by the pump 42, to reenter the absorber 10 as feed 12 after passing through the economizer 28 and the heat exchanger 44 where it is further cooled. The stripped sulfur dioxide and water vapor or steam leave the top of the stripping vessel at 46 and enter the heat exchanger 48 where they are condensed by ordinary cooling water, to the liquid state and pass to the tank 50. The liquid sulfur dioxide and water separate into two phases within the tank 50. The heavier sulfur dioxide phase is taken off as a product at 52, from whence it may be further processed into sulfuric acid, elemental sulfur or converted to industrial chemicals. The upper liquid phase in the tank 50 containing water and dissolved sulfur dioxide is returned as a reflux stream 54 to the rectification portion of the stripping vessel 26.

As an alternative to passing directly to the heat exchanger 48, the sulfur dioxide and steam leaving the stripping vessel 26 in the stream 46 may be passed through a fin type heat exchanger 49 over which air, as shown at 51, is blown in order to preheat the air which can be subsequently used for direct mixing with and reheating of the cold treated flue gas stream, as shown at 16, from the top of the absorber 10. This direct mixing and heating of clean flue gas avoids the need for a separate steam coil which is more costly and subject to corrosion.

The advantageous operating parameters are as follows. Steam is introduced into the reboiler tubes at a pressure greater than atmospheric. A preferred steam pressure is 15-65 psig which provides a steam temperature range of 250-310° F. in the reboiler. At this pressure and temperature, the rate of sulfur dioxide release from the citrate liquor is accelerated and the sulfur dioxide content in the vapor phase is increased. By contrast, operation at a steam pressure only slightly above atmospheric, for example, 5 psig, results in a reboiler temperature range of 215 to 220° F. and steam requirements several-fold higher than the 5 to 8 pounds of steam required per pound of sulfur dioxide stripped at the high pressure.

With a steam pressure of 15-65 psig, the cooling water in the heat exchanger 48 may be at a temperature range of 50 to 90° F. to produce liquid sulfur dioxide as an overhead product. However, operation at atmospheric pressure or 5 psig requires a drying and refrigeration system to recover the stripped sulfur dioxide as a product liquid. The overhead stream 46 leaving the recitifcation or top section of the stripping vessel 26 is at electrically heated to the overhead temperature to eliminate heat loss from this source.

The results of various representative runs of the fractionation of 0.5 molar citrate solution having initial PH of 3.95 and carried out at 65 psig are set forth in Table 1. Run 1 was carried out on a different day than run 2. The results show that steam economies of 5.4 to 8.9 pounds of steam per pound of sulfur dioxide stripped are obtained with the degree of stripping varying from 86 to 98 percent. Moreover, the second run showed that there was no difficulty in obtaining a two-phase condensate at condensing temperatures up to 89° F. and a pressure of 65 psig. This sulfur dioxide layer was found to contain about 5 percent water.

TABLE 1

| | | TEMPERATURE ° F | | | | | |
|---|---|---|---|---|---|---|---|
| RUN | TIME, MIN. | POT | OVERHEAD | RECYCLE | REFLUX | STEAM ECONOMY lb. STEAM/ lb. $SO_2$ | PERCENT SULFUR DIOXIDE STRIPPED |
| 1 | 0 | 306 | (300) | 302 | (60) | | |
|  | 68 | 310 |  | 300 |  | 5.4 | 88 |
|  | 103 | 310 | (300) | 300 | 55 | 6.2 | 86 |
| 2 | 0 | 310 | 303 | 280 | 56 | | |
|  | 35 | 311 | 305 | 300 | 55 | 5.8 | 93 |
|  | 65 | 313 | 296 | 295 | 76–86 | 7.4 | 93 |
|  | 105 | 312 | 301 | 295 | 80 | 8.9 | 88 |
|  | 135 | 311 | 300 | 295 | 86 | 8.5 | 90 |
|  | 215 | 311 | 296 | 295 | 89 | 8.2 | 91 | a temperature of 280 to 290° F. and can be used to preheat air to subsequently provide a 20° F. reheat of treated flue gas. That is, the flue gas stream leaving the top of the absorber at 18 is at about 120 to 140° F. and can be reheated by this preheated air to about 140 to 160° F. by judicious use of the heat of the overhead stream 46. Moreover, by operating the stripping vessel at 50-65 psig, the stripping vessel becomes a compact unit because the actual volume of gas flow is one-fifth that of a low pressure unit.

The superior steam economy of the high pressure stripping of sulfur dioxide from a citrate buffered solution was confirmed by testing on an 8-inch diameter stripping column to simulate gas desulfurization on a 0.25 megawatt scale. The test equipment included a packed tower of 7⅝ inch inside diameter filled with 12 feet of ½ inch cermaic berl saddles. The tower was maintained at 65 psig by nitrogen pressure. A charge of 21 gallons of 0.5 molar citrate soution was made up to a PH of 4.0 by blending 0.5 molar citrate acid and 0.5 molar sodium citrate. The bottom liquor was cooled and recycled at 2.25 gallons per minute under a pressure of 20 PSI above system pressure through a packed holding tank and a sight glass. After releasing the pressure to 65 psig, the recycle was reheated to within 5–10° F. of the overhead temperature and fed into the tower three-fourths of the way up.

A metered amount of liquid sulfur dioxide was pumped into the pressurized recycled stream prior to the holdup section. The recycle in the last run was analyzed for bottom and recycle compositions. Overhead condensate was collected in a teller and the upper phase pumped into the top of the tower. The bottom phase was drained into a receiver maintained at a pressure of 55 psig. Flow rates of both layers were determined by stopping their flows and timing the build-up in the teller.

The steam economy was determined by heat balances around the tower. Steam condensate was not collected at the bottom since this steam included condensate in the feed lines and from the still pot. The column was In a citrate steam stripping process for flue gas desulfurization for a 25 megawatt plant producing 110,000 ACFM of flue gas at 300° F., the steam consumption is 12,500 pounds per hour with a power consumption of 280 kilowatts and 30 STPD of liquid sulfur dioxide is recovered. The total energy need is therefore 362 BTU per kilowatt hour (KWH). These calculations are based on a 25 megawatt boiler fired with 3.5 percent sulfur coal and assume the presence of an electrical precipitor with 99.5 percent efficiency.

A comparison of incremental energy needs for various flue gas desulfurization processes are set forth in Table 2. The evaluation of Table 2 assumes a 500 megawatt boiler using 3.5 percent sulfur coal with an electrostatic precipitor of 99.5 percent efficiency and includes a 20° F. reheat of flue gas for the citrate pressure-stripping processes, although in most cases the energy penalty for reheat is of the order of 1 percent at 100 BTU/KWH for which no special deduction has been taken in these figures. The results show that even if the steam consumption were increased by 50 percent due to site conditions, fuel consumption would increase only from 362 to 487 BTU/KWH as compared to 607 to 1038 BTU/KWH for other regenerable flue gas desulfurization processes.

TABLE 2

| Process | Total Incremental Fuel Consumption (BTU/KWH) |
|---|---|
| Limestone | (390) |
| Magnesia | 1038 (Sulfur) |
|  | 604 (Acid) |
| Wellman-Lord Sulfite Scrubbing | 840 |
| Citrex (Phosphate) | 670 |
| Atomic International Process | 670 |
| $SO_2$ Steam-Stripping Process (at 5 lbs. steam per pound $SO_2$) | 362 |

The foregoing results are both surprising and unexpected in that one would normally expect that stripping sulfur dioxide under pressure would require a greater amount of steam per pound of sulfur dioxide stripped than stripping at atmospheric pressure. Not only is such not shown not to be the case according to the process of this invention, but in addition, many other advantages are obtained in the process. For example, when stripping at atmospheric pressure the sulfur dioxide must be dried in a column with a suitable material such as concentrated sulfuric acid, silica gel, alumina or the like and then refrigerated or condensed for liquefaction. Here a liquid sulfur dioxide product is obtained by the use of cooling water at normal plant cooling water temperatures. While the embodiment described is directed to the removal of sulfur dioxide from a citrate buffered solution, the process is applicable to removal from other organic buffered solutions of the type such as glycolate, glyoxalate, acetate and the like. Also, the system is applicable to any gas containing sulfur dioxide such as smelter gas and the like and the use of the term flue gas is intended to apply to such.

I claim:

1. In a process for the desulfurization of gases wherein sulfur dioxide is removed from the gases by absorbtion in a citrate buffered aqueous solution which undergoes a regenerative process to yield sulfur-based byproducts, the improvement resulting in the recovery of sulfur dioxide from the citrate buffered aqueous solution comprising heating the aqueous solution containing absorbed sulfur dioxide to a temperature above 212° F. and to strip the sulfur dioxide therefrom, maintaining the pressure substantially greater than atmospheric pressure, and recovering sulfur dioxide vapor.

2. The improved process as claimed in claim 1 wherein the pressure is 15-65 psig.

3. The improved process as claimed in claim 1 wherein the heating is carried out with steam at superatmospheric pressure and the amount of steam required per pound of sulfur dioxide removed is less than that required when heating with steam at atmospheric pressure.

4. The improved process as claimed in claim 1 wherein the solution is heated to a temperature in the range of 250–310° F.

5. The improved process as claimed in claim 3 wherein the amount of steam required per pound of sulfur dioxide recovered is in the range of 5 to 8 pounds.

6. The improved process as claimed in claim 1 wherein the recovered sulfur dioxide vapor is condensed to liquid sulfur dioxide using a cooling medium having a temperature in the range of 50 to 90° F.

7. The improved process as claimed in claim 1 wherein the sulfur dioxide vapor stripped from the solution has a temperature in the range of 240 to 300° F.

8. The process of recovering sulfur dioxide gases comprising the steps of contacting the gases containing sulfur dioxide with an organically buffered aqueous solution to absorb sulfur dioxide in said solution, then heating said solution containing sulfur dioxide to a temperature greater than 212° F. and under pressure substantially greater than atmospheric pressure and then recovering and condensing the water vapor and sulfur dioxide for separation and recovery.

9. The process defined in claim 8 wherein the pressure is from 15 to 65 psig.

10. The process defined in claim 8 wherein the temperature of said solution is from 250° F. to 310° F.

11. The process of removing sulfur dioxide from gases comprising the steps of contacting the gases containing sulfur dioxide with a buffered aqueous solution containing one or more organic radicals taken from the group consisting of citrate, glycolate, glyoxalate and acetate, then heating the solution to a temperature of from 250° F. to 310° F. at a pressure of from 15 to 65 psig, and then removing and condensing the water vapor and sulfur dioxide for separation and recovery.

12. The process defined in claim 11 wherein said water vapor and sulfur dioxide are condensed in a heat exchanger having cooling fluid at a temperature of from about 50° F. to 90° F. to separate sulfur dioxide and water into substantially two liquid phases.

13. A process for regenerating sulfur dioxide from an organic buffered aqueous solution in which it is absorbed comprising heating the aqueous solution to a temperature substantially in excess of 215° F., maintaining a pressure of from 15 to 65 psig above the solution, recovering sulfur dioxide and water vapor, and then condensing the sulfur dioxide and water vapor in a heat exchanger in the absence of drying, refrigeration or compression and obtaining liquid sulfur dioxide.

* * * * *